United States Patent
Shariff et al.

(10) Patent No.: US 11,256,273 B2
(45) Date of Patent: Feb. 22, 2022

(54) FLOW MANAGEMENT SYSTEMS AND RELATED METHODS FOR OIL AND GAS APPLICATIONS

(71) Applicant: Saudi Arabian Oil Company, Dhahran (SA)

(72) Inventors: Maher Maqbool Shariff, Dhahran (SA); Taras Yurievich Makogon, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 124 days.

(21) Appl. No.: 16/923,771

(22) Filed: Jul. 8, 2020

(65) Prior Publication Data
US 2022/0011790 A1   Jan. 13, 2022

(51) Int. Cl.
*F03B 13/02* (2006.01)
*G05D 7/06* (2006.01)
(Continued)

(52) U.S. Cl.
CPC ....... *G05D 7/0629* (2013.01); *E21B 41/0007* (2013.01); *F16L 55/00* (2013.01); (Continued)

(58) Field of Classification Search
CPC ... G05D 7/0629; E21B 41/0007; E21B 23/00; E21B 33/127; E21B 17/00; E21B 47/09; (Continued)

(56) References Cited

U.S. PATENT DOCUMENTS 362,368 A    5/1887  Dikeman
2,390,093 A  12/1945 Ed
(Continued)

FOREIGN PATENT DOCUMENTS

AU   2009202232   12/2009
CA      1304286    6/1992
(Continued)

OTHER PUBLICATIONS

PCT International Search Report and Written Opinion in International Appln. No. PCT/US2021/040813, dated Oct. 1, 2021, 13 pages.

(Continued)

*Primary Examiner* — Minh Q Le
(74) *Attorney, Agent, or Firm* — Fish & Richardson P.C.

(57) ABSTRACT

A flow management system includes an adjustable compactor configured for attachment to a wall surface of a conduit and being adjustable between an extended configuration and a reference configuration, an electric actuator in fluid communication with the adjustable compactor, and a control module. The control module is configured to control the electric actuator to flow a current to the adjustable compactor to generate an electric field that causes extension of the adjustable compactor for compacting a flow blockage within the conduit to create a channel adjacent the flow blockage and to terminate a flow of the current to remove the electric field at the adjustable compactor to cause the adjustable compactor to return to the reference configuration for opening the channel to a fluid flow within the conduit.

20 Claims, 10 Drawing Sheets

(51) Int. Cl.

| | | |
|---|---|---|
| *E21B 41/00* | (2006.01) | |
| *F17D 3/01* | (2006.01) | |
| *F16L 55/00* | (2006.01) | |
| *E21B 47/09* | (2012.01) | |
| *E21B 33/127* | (2006.01) | |
| *E21B 33/12* | (2006.01) | |
| *E21B 23/00* | (2006.01) | |
| *E21B 17/00* | (2006.01) | |
| *E21B 37/00* | (2006.01) | |

(52) U.S. Cl.
CPC ............... *F17D 3/01* (2013.01); *E21B 17/00* (2013.01); *E21B 23/00* (2013.01); *E21B 33/12* (2013.01); *E21B 33/127* (2013.01); *E21B 37/00* (2013.01); *E21B 47/09* (2013.01)

(58) Field of Classification Search
CPC .......... E21B 37/00; E21B 33/12; F16L 55/00; F17D 3/01
USPC ....... 137/561 R, 244, 245.5, 487.5; 134/147, 134/166 C, 187, 188; 166/284, 380; 175/105
See application file for complete search history.

(56) References Cited

U.S. PATENT DOCUMENTS

| | | | |
|---|---|---|---|
| 3,623,684 A | 11/1971 | Kline | |
| 4,483,393 A | 11/1984 | More et al. | |
| 4,596,586 A | 6/1986 | Davies et al. | |
| 5,619,611 A | 4/1997 | Loschen et al. | |
| 5,981,447 A | 11/1999 | Chang et al. | |
| 6,093,869 A | 7/2000 | Roe et al. | |
| 6,307,191 B1 | 10/2001 | Waycuilis | |
| 6,343,652 B1 | 2/2002 | Corre et al. | |
| 6,843,832 B2 | 1/2005 | Greene et al. | |
| 6,854,522 B2 | 2/2005 | Brezinski et al. | |
| 6,939,082 B1 | 9/2005 | Baugh | |
| 7,107,706 B1 | 9/2006 | Bailey et al. | |
| 7,279,052 B2 | 10/2007 | Kinnari et al. | |
| 8,003,573 B2 | 8/2011 | Ballard et al. | |
| 8,337,603 B2 | 12/2012 | Akhras et al. | |
| 8,425,549 B2 | 4/2013 | Lenker et al. | |
| 8,584,687 B1* | 11/2013 | Chen .................. B08B 3/102 134/137 | |
| 8,869,880 B2 | 10/2014 | McClanahan et al. | |
| 9,157,290 B2 | 10/2015 | Habesland et al. | |
| 9,759,025 B2 | 9/2017 | Vavik | |
| 9,828,847 B2 | 11/2017 | Vavik | |
| 9,833,727 B1 | 12/2017 | Ball, IV | |
| 10,494,894 B2 | 12/2019 | Al-Gouhi et al. | |
| 11,131,158 B1 | 9/2021 | Shariff et al. | |
| 11,149,510 B1* | 10/2021 | Al-Abdulrahman .... E21B 31/18 | |
| 2002/0125008 A1* | 9/2002 | Wetzel ................ E21B 47/07 166/278 | |
| 2005/0178562 A1 | 8/2005 | Livingstone | |
| 2005/0205261 A1 | 9/2005 | Andersen et al. | |
| 2007/0277967 A1 | 12/2007 | Oserod | |
| 2009/0205675 A1 | 8/2009 | Sarkar | |
| 2010/0236785 A1 | 9/2010 | Collis et al. | |
| 2011/0061862 A1 | 3/2011 | Loretz et al. | |
| 2013/0008471 A1* | 1/2013 | Borkowski ............ E03C 1/308 134/22.12 | |
| 2013/0043887 A1* | 2/2013 | Ziolkowski ............ F17D 5/00 324/649 | |
| 2013/0048295 A1 | 2/2013 | Beynet et al. | |
| 2014/0060580 A1 | 3/2014 | O'Donnell et al. | |
| 2016/0145958 A1 | 5/2016 | Richards et al. | |
| 2017/0204702 A1* | 7/2017 | Hansen ................ E21B 37/00 | |
| 2018/0065753 A1 | 3/2018 | Schwichtenberg et al. | |
| 2018/0192476 A1 | 7/2018 | Chaudhry et al. | |
| 2018/0298699 A1* | 10/2018 | Kartha ................ E21B 17/1021 | |
| 2019/0120020 A1* | 4/2019 | Rageot ................ E21B 43/0175 | |
| 2019/0145582 A1 | 5/2019 | Hesketh-Prichard et al. | |
| 2020/0056444 A1* | 2/2020 | Benzie ................ E21B 33/12 | |
| 2020/0080386 A1 | 3/2020 | Yang et al. | |
| 2021/0115751 A1 | 4/2021 | Quero et al. | |
| 2021/0293119 A1* | 9/2021 | Rogers ................ E21B 43/108 | |
| 2021/0332654 A1* | 10/2021 | Patterson ............ E21B 19/24 | |

FOREIGN PATENT DOCUMENTS

| | | |
|---|---|---|
| EP | 2299585 | 7/2013 |
| JP | 5143324 | 2/2013 |
| KR | 850001746 | 4/1985 |
| KR | 950003920 | 4/1995 |
| KR | 0132212 | 4/1998 |
| WO | WO 2010139943 | 12/2010 |
| WO | WO 2013169679 | 11/2013 |
| WO | WO 2016059446 | 4/2016 |

OTHER PUBLICATIONS

PCT International Search Report and Written Opinion in International Appln. No. PCT/US2021/040823, dated Oct. 5, 2021, 13 pages.

Trofaier et al., "Optimizing Separation Efficiency Of Produced Water Tanks By Installing CFD Designed Internals," SPE-174937-MS, Presented at the SPE Annual Technical Conference and Exhibition, Houston, TX, Sep. 28-30, 2015; Society of Petroleum Engineers, 2015, 11 pages.

\* cited by examiner

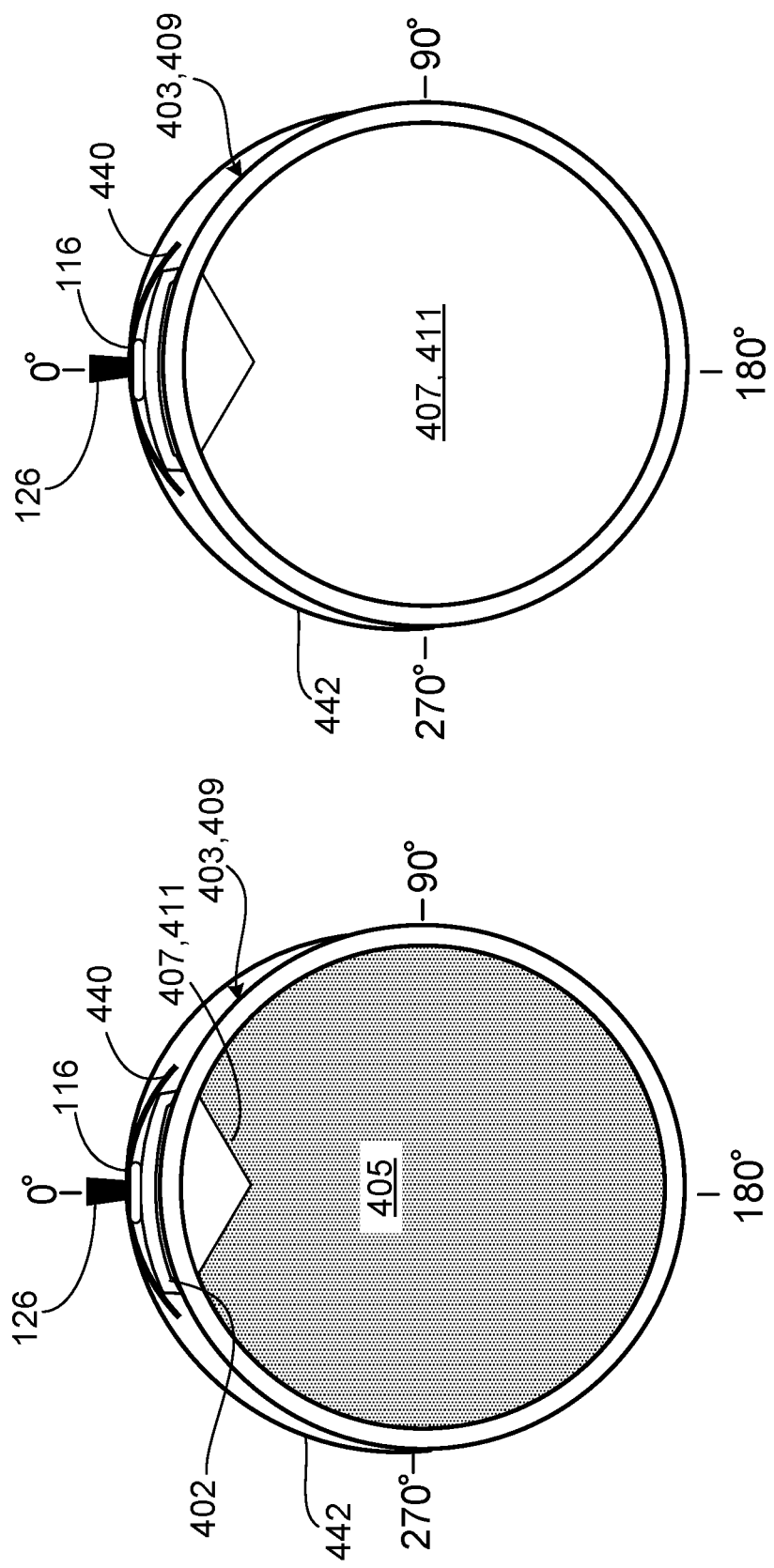

FLOW MANAGEMENT SYSTEMS AND RELATED METHODS FOR OIL AND GAS APPLICATIONS

TECHNICAL FIELD

This disclosure relates to flow management systems utilizing electric field actuation, as well as related methods of managing fluid flows within production conduits.

BACKGROUND

Production pipelines carrying oil and gas can extend for thousands of kilometers between reservoirs and oil and gas terminals. In some cases, a fluid flow of oil and gas may become partially or completely blocked at certain locations along a production pipeline due to sedimentation of various substances along the pipeline, such as gas hydrates and scale. Accumulation of these substances sometimes results from the combination of a relatively high fluid pressure and a relatively low temperature inside of the pipeline and tends to occur in low-lying sections of the pipeline. Accumulation of the substances may occur over a period of minutes to days and may completely block the fluid flow if left unmitigated. Blockage of the fluid flow can result in costly, delayed arrival of the fluid flow to a final destination.

SUMMARY

This disclosure relates to flow management systems designed to mitigate a pliable blockage within a metallic or non-metallic oil and gas production conduit. An example flow management system includes an adjustable compactor that is attachable to a wall of a conduit for compacting a blockage within the conduit to reopen the conduit to fluid flow. The adjustable compactor is deformable between an extended configuration and a reference, non-extended configuration under the influence of an electric field. Accordingly, the flow management system also includes an electric actuator (for example, a power source) for delivering a current to or removing a current from the adjustable compactor to respectively generate or remove an electric field at the adjustable compactor. The flow management system also includes an actuation line extending between the electric actuator and the adjustable compactor and a control module for controlling operation of the electric actuator and various other associated components of the flow management system. Depending on certain aspects of the conduit, the adjustable compactor may be attached to an interior wall surface of the conduit or to an exterior wall surface of the conduit.

In one aspect, a flow management system includes an adjustable compactor configured for attachment to a wall surface of a conduit and being adjustable between an extended configuration and a reference configuration, an electric actuator in fluid communication with the adjustable compactor, and a control module. The control module is configured to control the electric actuator to flow a current to the adjustable compactor to generate an electric field that causes extension of the adjustable compactor for compacting a flow blockage within the conduit to create a channel adjacent the flow blockage and to terminate a flow of the current to remove the electric field at the adjustable compactor to cause the adjustable compactor to return to the reference configuration for opening the channel to a fluid flow within the conduit.

Embodiments may provide one or more of the following features.

In some embodiments, the adjustable compactor includes a shape-adjustable device.

In some embodiments, the adjustable compactor includes an electrosensitive device configured to deform under a force of the electric field.

In some embodiments, the adjustable compactor includes a core layer and an outer protective layer that surrounds the core layer.

In some embodiments, the core layer includes one or more electroactive polymer materials.

In some embodiments, the outer protective layer includes a corrosion-resistant material.

In some embodiments, the adjustable compactor is an elongate structure.

In some embodiments, the adjustable compactor is configured to deform radially inward with respect to the conduit to compact the flow blockage and to deform radially outward with respect to the conduit to expose the channel.

In some embodiments, the electric actuator is disposed at a surface above a formation in which the conduit is disposed.

In some embodiments, the electric actuator is disposed at a seabed in which the conduit is disposed.

In some embodiments, the electric actuator is disposed in an autonomous vehicle or is fixedly installed to a generator.

In some embodiments, the flow management system further includes an actuation line that extends from the electric actuator to an electrical connector at the adjustable compactor.

In some embodiments, the flow management system further includes an electrical cable that extends from the electrical connector along a length of the adjustable compactor.

In some embodiments, the actuation line includes an electrical cable.

In some embodiments, the flow management system further includes a flow rate sensor for determining a flow rate of fluid flowing within the conduit.

In some embodiments, the controller is operable to control the electric actuator based on data acquired by the flow rate sensor.

In some embodiments, the flow management system further includes multiple straps for securing the adjustable compactor to the conduit.

In some embodiments, each strap of the multiple straps is adjustable in diameter.

In some embodiments, the multiple straps are distributed along an entire length of the adjustable compactor.

In some embodiments, the flow management system further includes a protective cover arranged along an outer side of the adjustable compactor.

In another aspect, a method of managing a fluid flow within a conduit includes determining a presence of a flow blockage within the conduit, the conduit being equipped with an adjustable compactor, controlling an electric actuator to flow a current to the adjustable compactor to generate an electric field at the adjustable compactor, extending the adjustable compactor radially inward from a reference configuration under a force of the electric field, compacting the flow blockage radially along a length of the adjustable compactor to create a channel adjacent the flow blockage, and returning the adjustable compactor to the reference configuration to expose the channel and open the conduit to fluid flow.

Embodiments may provide one or more of the following features.

In some embodiments, the method further includes changing a shape of the adjustable compactor.

In some embodiments, the adjustable compactor includes an electrosensitive device.

In some embodiments, the adjustable compactor includes a core layer and an outer protective layer that surrounds the core layer.

In some embodiments, the core layer includes one or more electroactive polymer materials.

In some embodiments, the outer protective layer includes a corrosion-resistant material.

In some embodiments, compacting the flow blockage includes providing direct contact between the adjustable compactor and the flow blockage.

In some embodiments, compacting the flow blockage includes deforming the conduit radially inward.

In some embodiments, the method further includes controlling the electric actuator to terminate a flow of the current to the adjustable compactor to remove the electric field from the adjustable compactor.

In some embodiments, returning the adjustable compactor to the reference configuration includes causing the conduit to deform radially outward to expose the channel.

In some embodiments, the method further includes flowing the current along an actuation line that extends between the electric actuator and an electrical connector at the adjustable compactor.

In some embodiments, the method further includes flowing the current along a length of the adjustable compactor.

In some embodiments, the actuation line includes an electrical cable.

In some embodiments, the method further includes determining a flow rate of fluid flowing through the conduit at a flow rate sensor.

In some embodiments, the method further includes controlling the electric actuator based on data acquired by the flow rate sensor.

In some embodiments, the method further includes securing the adjustable compactor to the conduit with multiple straps.

In some embodiments, the method further includes adjusting each strap of the multiple straps based on a local diameter of the conduit.

In some embodiments, the method further includes distributing the multiple straps along an entire length of the adjustable compactor.

In some embodiments, the method further includes installing a protective cover along an outer side of the adjustable compactor.

In some embodiments, the method further includes installing the adjustable compactor to an exterior surface of the conduit.

The details of one or more embodiments are set forth in the accompanying drawings and description. Other features, aspects, and advantages of the embodiments will become apparent from the description, drawings, and claims.

DESCRIPTION OF DRAWINGS

FIG. 15 is a cross-sectional view of the conduit of FIG. 12, partially obstructed with the flow blockage and equipped with the adjustable compactor of FIG. 12 in the reference configuration.

FIG. 16 is a cross-sectional view of the conduit of FIG. 12 in a state fully open to fluid flow and equipped with the adjustable compactor of FIG. 12 in the reference configuration.

DETAILED DESCRIPTION

Figure 1:
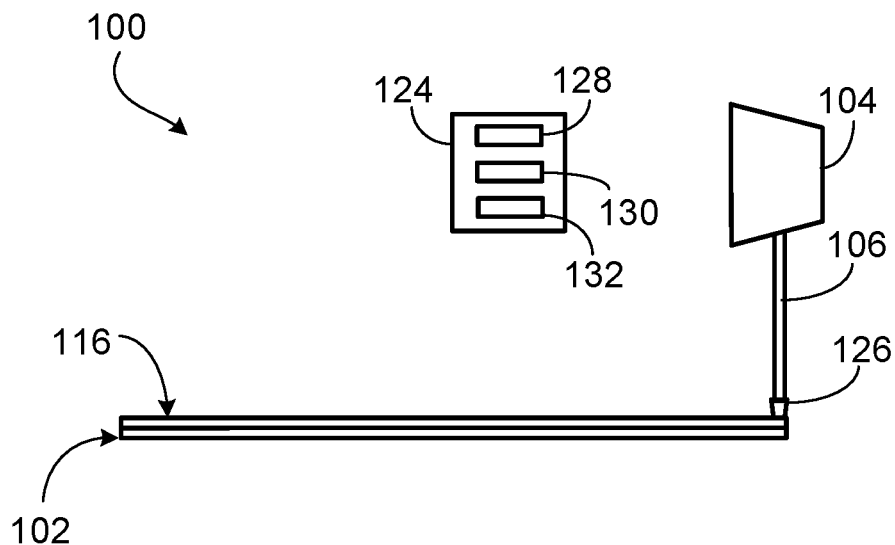
FIG. 1 is a side perspective view of a flow management system.
Figure 2:
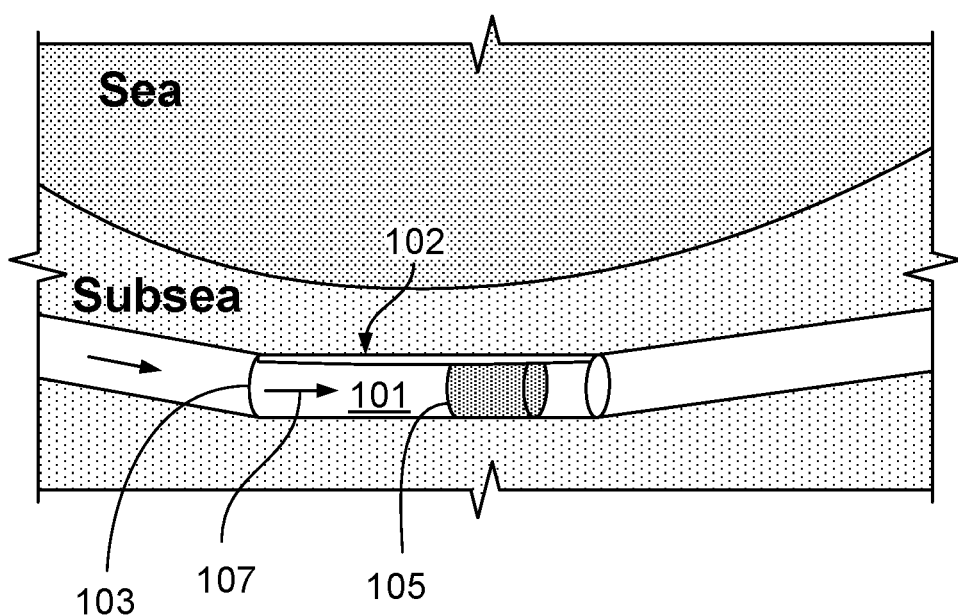
FIG. 2 is a side perspective view of a deployed conduit, obstructed with a flow blockage and equipped with an adjustable compactor of the flow management system of FIG. 1 along an interior surface of the conduit.
Figure 3:
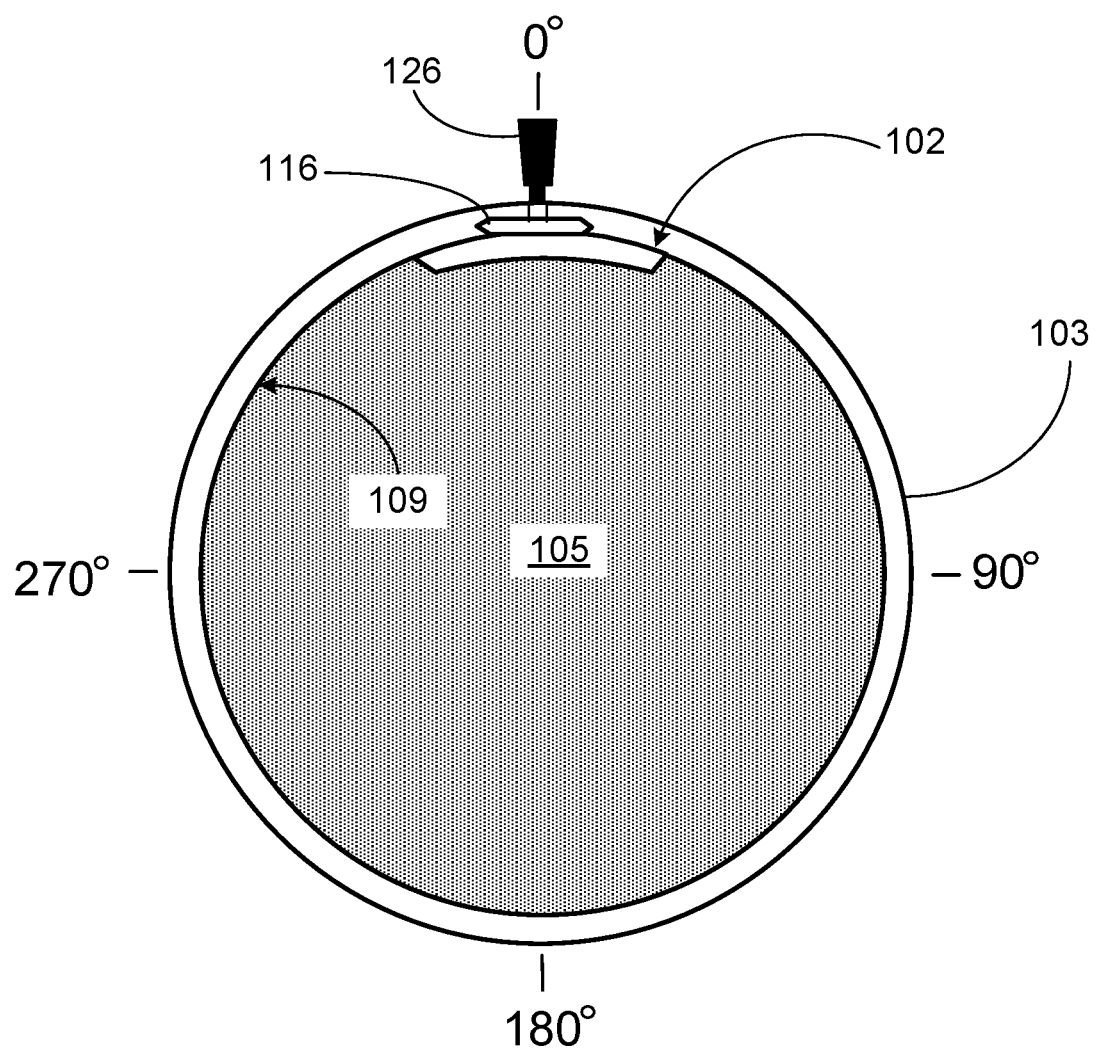
FIG. 3 is a cross-sectional view of the conduit of FIG. 2, obstructed with the flow blockage and equipped with the adjustable compactor of FIG. 1 in a reference configuration.

Referring to FIGS. 1-3, a flow management system 100 is designed to reopen a flow channel 101 of a conduit 103 to fluid flow amidst an accumulation of substances that form a blockage 105 within the conduit 103. In some examples, the blockage 105 may be a compliant obstruction formed from one or more substances, such as a gas hydrate, an oil hydrate, sand, scale, corrosion layers, or several other solid sediments that may accumulate in oil and gas conduits. In the example of FIG. 2, the conduit 103 is a rigid pipe segment formed of steel or a non-metallic plastic or is a flexible pipe segment (for example, a flexible transfer hose) that may be formed of one or more of a flexible steel carcass and polymeric containment materials. The conduit 103 carries a flow of fluid 107 that includes one or both of oil and gas. In some embodiments, the conduit 103 is a segment of a subsea production pipeline, as shown in FIG. 2. In other embodiments, the conduit 103 is a segment of an onshore production pipeline.

Referring particularly to FIG. 1, the flow management system 100 includes an adjustable compactor 102 (for example, a shape-adjustable compactor) for compacting the blockage 105 to reopen the flow channel 101 to fluid flow, an electric actuator 104 for activating and deactivating the adjustable compactor 102, and an actuation line 106 extending between the electric actuator 104 and the adjustable compactor 102. The flow management system 100 further includes a control module 124 located at the surface for controlling operation of the electric actuator 104 and various components of the flow management system 100. The control module 124 includes hardware 128, one or more processors 130 implemented on the hardware 128, and a user interface 132.

The adjustable compactor 102 has a thin profile and extends along a length of the conduit 103. In the example of FIG. 2, the adjustable compactor 102 is preinstalled to an inner surface 109 of the conduit 103. For example, the adjustable compactor 102 is installed at an axial location along the conduit 103 that is predicted to be vulnerable to blockage by multiphase flow assurance hydraulic analyses. Such locations are often at low-lying positions where the effect of gravity tends to promote accumulation of substances or at positions that experience low fluid velocity such that low fluid flow shear would tend to result in an accumulation of substances along the conduit 103. Advantageously, interior placement of the adjustable compactor 102 along the inner surface 109 does not interfere with pipeline maintenance when performing scraping or utilizing intelligent inspection devices, such as magnetic flux leakage devices.

The adjustable compactor 102 may generally be installed in a pipe of any configuration (for example, horizontal or vertical) and any shape (for example, straight, conical, or another shape). In some examples, as shown in FIG. 3, the adjustable compactor 102 is installed at a circumferential position between about 315 degrees (for example, −45 degrees) and about 45 degrees with respect to a reference position of 0 degrees (for example, a twelve o'clock position) or more particularly at a circumferential position between about 350 degrees (for example, −10 degrees) and about 10 degrees with respect to the reference position. Installation of the adjustable compactor 102 within such ranges in proximity to the top, twelve o'clock circumferential position takes advantage of the effect of gravity, which promotes settling of any blockage debris away from the adjustable compactor 102 once the blockage 105 has been compacted. In other examples, the adjustable compactor 102 may be installed at any circumferential position between 0 degrees and 360 degrees around a circumference of the conduit 103.

Figure 4:
FIG. 4 is an enlarged cross-sectional view of the adjustable compactor of FIG. 1 in the reference configuration.

Referring to FIGS. 3 and 4, the adjustable compactor 102 includes a core layer 120 and an outer protective layer 122. The adjustable compactor 102 is an extensible, electrosensitive structure formed of one or more electroactive polymers that allow the adjustable compactor 102 to reversibly change shape in response to application of an electric field. For example, the adjustable compactor 102 can be electrically activated by an electric field to deform into an extended configuration, as shown in FIG. 4, and can be electrically deactivated to deform into to a reference configuration (for example, an non-deformed, non-extended configuration), as shown in FIG. 3. In the example of FIGS. 3 and 4, the adjustable compactor 102 has a generally arcuate cross-sectional shape in the reference configuration and a generally triangular cross-sectional shape in the extended configuration. However, in other embodiments, an adjustable compactor that is otherwise substantially similar in construction and function to the adjustable compactor 102 may have different cross-sectional shapes in the extended and reference configurations.

The adjustable compactor 102 typically has a length that falls in a range of about 5 meters (m) to about 50 m, a thickness that falls a range of about 0.1 centimeters (cm) to about 1 cm, and a width (for example, in the reference configuration) that falls in a range of about 0.5 cm to about 5 cm. The adjustable compactor 102 is typically deformable from the reference configuration to the extended configuration by a depth of up to about 0.01 cm to about 0.1 cm. The core layer 120 of the adjustable compactor 102 is typically made of one or more electroactive polymers that together provide a solid composite material formulation that can mechanically withstand multiple actuation cycles and temperature and pressure spikes within the flow channel 101. The outer protective layer 122 is typically made of one or more corrosion-resistant materials that can chemically withstand the corrosive environment of the flow channel 101. Example materials from which the core layer 120 may be made include soft doped piezo ceramic materials characterized by a relatively high piezoelectric voltage coefficient. Example materials from which the outer protective layer 122 may be made include steel or other rigid materials.

Referring again to FIG. 1, the actuation line 106 is an electrical cable that extends from the electric actuator 104 to an electrical connector 126 at an end of the adjustable compactor 102. An additional electrical cable 116 extends from the electrical connector 126 along a length of the adjustable compactor 102 to carry the current from the actuation line 106 along an entire length of the adjustable compactor 102. In some embodiments, the electrical cable 116 may be provided as a flat, flexible cable to ensure the flow of electrical current through an entire length of the core layer 120 of the adjustable compactor 102 in the reference configuration. In some embodiments, the electrical cable 116 may be arranged between the adjustable compactor 102 and the interior surface 109 of the conduit 103, as shown in FIG. 3. In other embodiments, the electrical cable 116 may be alternatively arranged at an exterior surface of the conduit 103 such that separation of the adjustable compactor 102 from the electrical cable 116 by a thickness of the conduit wall may reduce an efficiency of power transmission to the adjustable compactor 102. In some embodiments, the actuation line 106 may extend a length that falls in a range of about 5 m to about 50 m from the electric actuator 104 to an end of the adjustable compactor 102.

The actuation medium for actuating the adjustable compactor 102 is an electric field. Accordingly, the electric actuator 104 is a power source (for example, a current generator) that electrically operates the adjustable compactor 102 by delivering an alternating current to the adjustable compactor 102 along the actuation line 106 to generate the electric field (for example, applied by a time-varying magnetic field) at the adjustable compactor 102 or by terminating a flow of a current along the actuation line 106 to remove the electric field. The electric actuator 104 is typically located at the surface. However, in other embodiments, the electric actuator 104 may be located subsea if the electric actuator 104 is operated by a turbine or an impeller driven by fluid flow through a pipe connected to a motive source, such as a pump at a service truck or a service vessel. In some embodiments, the electric actuator 104 may be disposed in an autonomous vehicle (for example, a drone, an autonomous underwater vehicle, or another type of remotely operated vehicle) or permanently, fixedly installed as part of a generator (for example, a solar, wind, or diesel generator).

Figure 5:
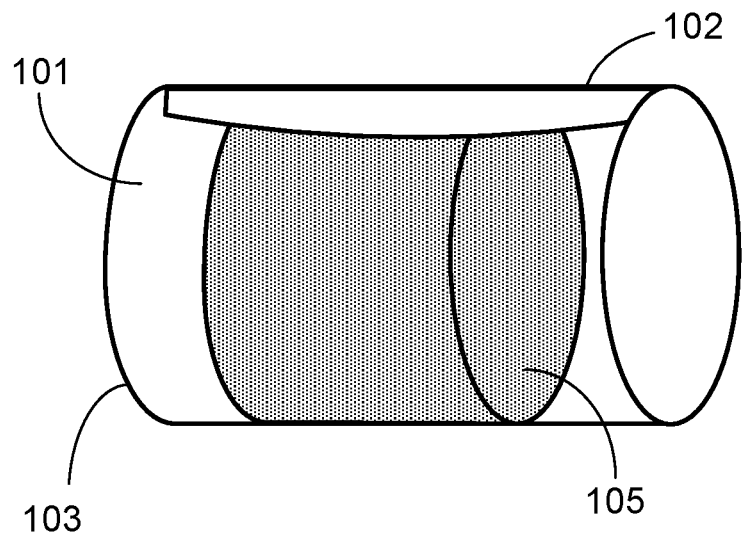
FIG. 5 is a side perspective view of the conduit of FIG. 2, obstructed with the flow blockage and equipped with the adjustable compactor of FIG. 1 in an extended configuration.
Figure 6:
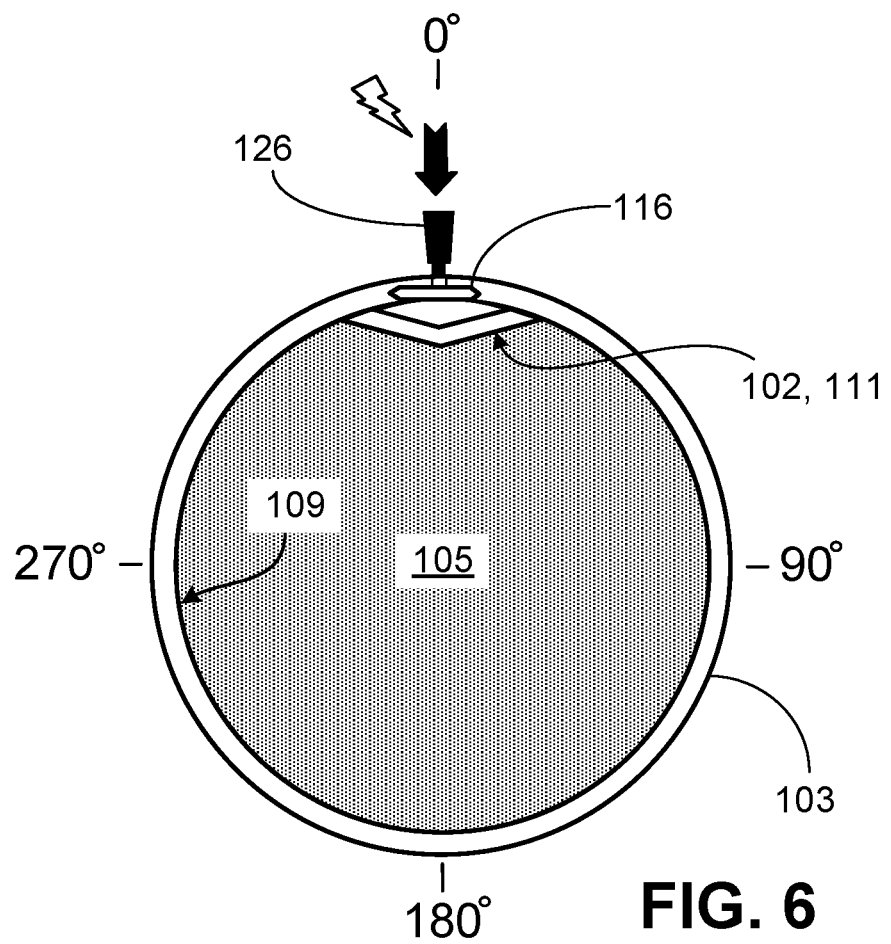
FIG. 6 is a cross-sectional view of the conduit of FIG. 2, obstructed with the flow blockage and equipped with the adjustable compactor of FIG. 1 in the extended configuration.

Referring to FIGS. 5 and 6, the control module 124 is operable to control the electric actuator 104 to deliver an alternating current to the adjustable compactor 102 to generate an electric field that causes the adjustable compactor 102 to deform into an extended configuration. The adjustable compactor 102 will remain in the extended configuration for as long as the electric field remains in effect (for example, for as long as the current flows to the adjustable compactor 102). During extension, the adjustable compactor 102 exerts a radial force to directly compact the blockage 105 in the conduit 103. Such compaction shatters the blockage 105 (for example, turning the blockage 105 into particles of debris) and accordingly creates an axial channel 111 within or adjacent the blockage 105.

Figure 7:
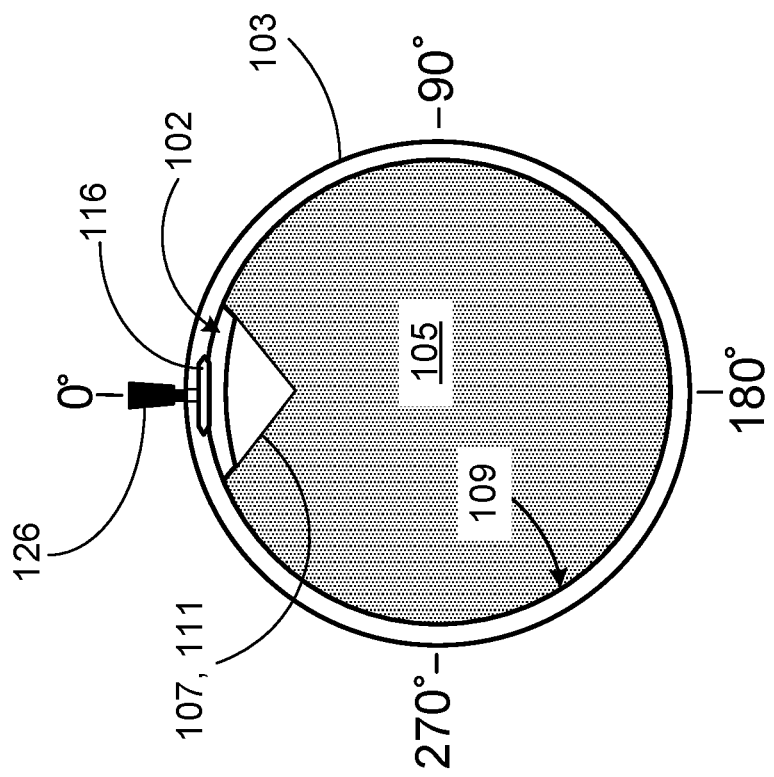
FIG. 7 is a cross-sectional view of the conduit of FIG. 2, partially obstructed with the flow blockage and equipped with the adjustable compactor of FIG. 1 in the reference configuration.
Figure 8:
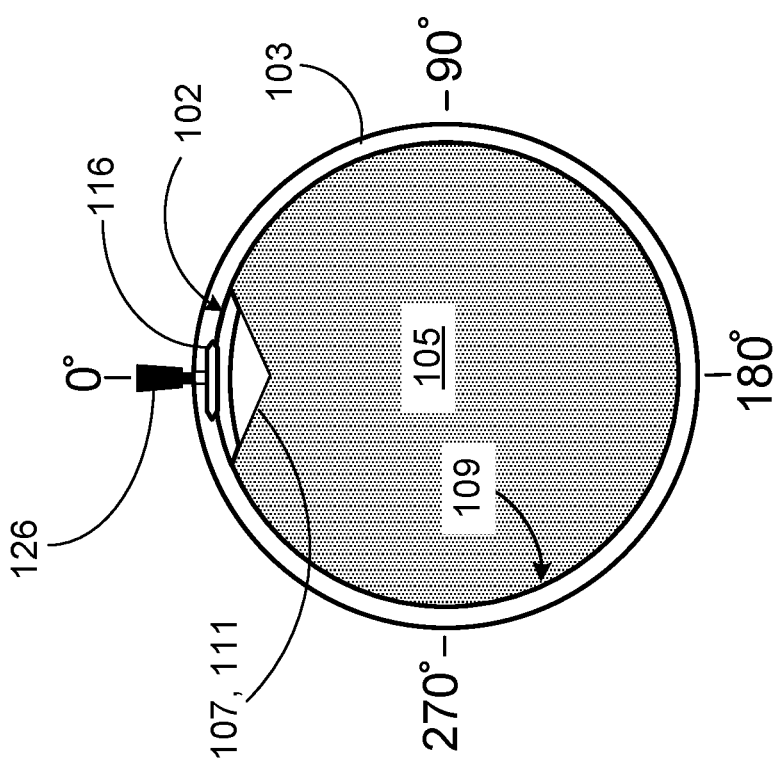
FIG. 8 is a cross-sectional view of the conduit of FIG. 2, partially, but less obstructed with the flow blockage and equipped with the adjustable compactor of FIG. 1 in the reference configuration.
Figure 9:
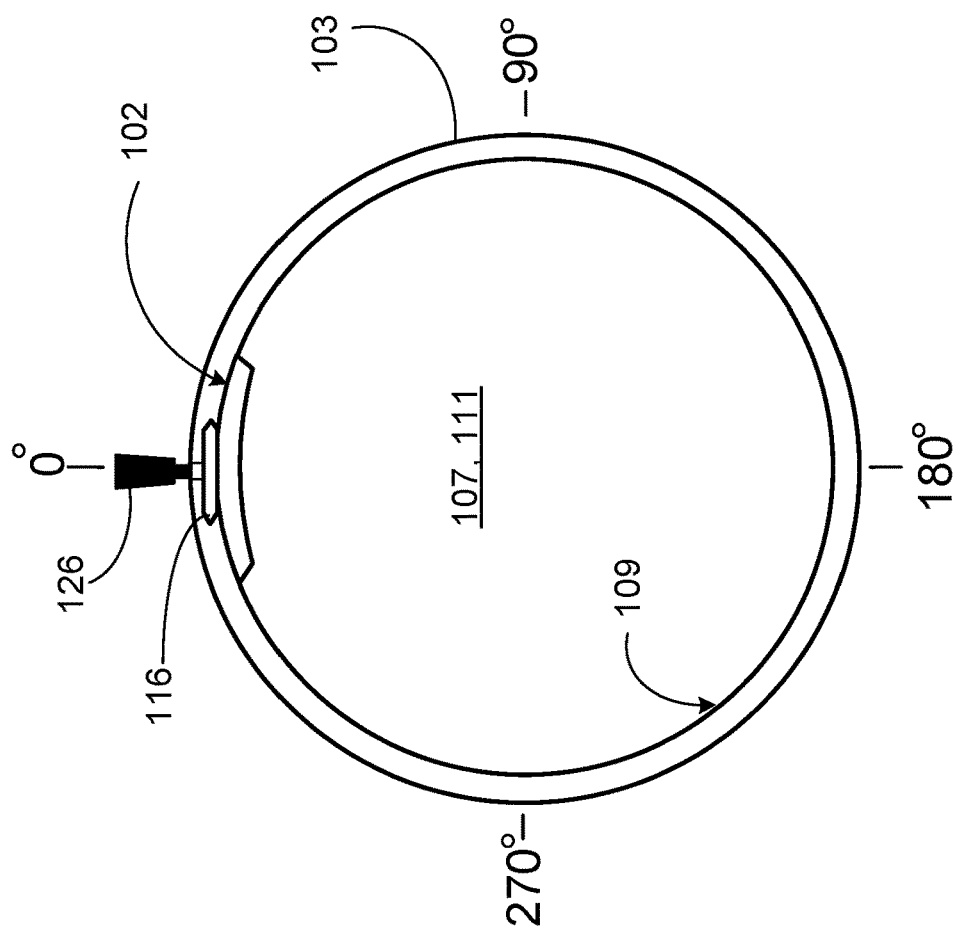
FIG. 9 is a cross-sectional view of the conduit of FIG. 2 in a state fully open to fluid flow and equipped with the adjustable compactor of FIG. 1 in the reference configuration.

Referring to FIG. 7, the control module 124 is further operable to control the electric actuator 104 to terminate the current and thereby terminate the electric field to cause the adjustable compactor 102 to revert back to the reference configuration, thereby opening the channel 111 to flow of the fluid 107 and accordingly resulting in depressurization of the fluid 107. With flow of the fluid 107 reestablished in the conduit 103, additional blockage remediation efforts can be carried out, such as circulating a solvent through the conduit 103 or deploying a heating means (for example, one or more of a chemical, electrical, and mechanical heating means) to the conduit 103. Referring to FIGS. 8 and 9, flow of the fluid 107 gradually washes out the blockage 105 and enlarges the channel 111 until the conduit 103 has been substantially cleared of the blockage 105 to permit free, unobstructed flow of the fluid 107.

During a production operation, an operator may observe a change in the flow rate of the fluid 107 or a change in a fluid pressure drop across the conduit 103. If the operator determines that such changes are due to a blockage 105, then the operator inputs an instruction at the user interface 132 to activate (for example, energize) the electric actuator 104. The control module 124 controls the electric actuator 104 to supply an alternating current to the adjustable compactor 102 to generate an electric field. The adjustable compactor 102 accordingly extends radially inward (for example, with respect to a central axis of the conduit 103) and compacts the blockage 105 to create a channel 111 within or adjacent the blockage 105.

The control module 124 subsequently deactivates (for example, de-energizes) the electric actuator 104 to cease the current flow and the associated electric field to return the adjustable compactor 102 to the reference configuration. Returning the adjustable compactor 102 to the reference configuration opens the channel 111 to fluid flow. Additional blockage remediation efforts are deployed to the channel 111, and normal production is resumed at the conduit 103. In some examples, actuation of the adjustable compactor 102 to destruct even partial blockages 105 in a vicinity of the adjustable compactor 102 can prevent or otherwise mitigate potential clogging of the conduit 103. Utilization of the flow management system 100 advantageously prevents the need to remediate blockages using conventional devices, such as electrically or hydraulically actuated depressurization pumps, which can cost in the tens of millions of dollars. Accordingly, the flow management system 100 provides a cost-effective solution for mitigating blockages in production pipelines in onshore, subsea, and arctic environments.

In some embodiments, the control module 124 automatically controls the electric actuator 104 to supply a current to the adjustable compactor 102 without input from an operator, such as when a temperature inside of the conduit 103 approaches a freezing temperature. In some embodiments, the control module 124 is additionally programmed to operate in conjunction with online advisory tools or machine learning flow assurance tools (such as a pipeline optimization monitoring advisory solution) that can predict when a blockage is likely to occur and when to actuate the adjustable compactor 102.

Figure 10:
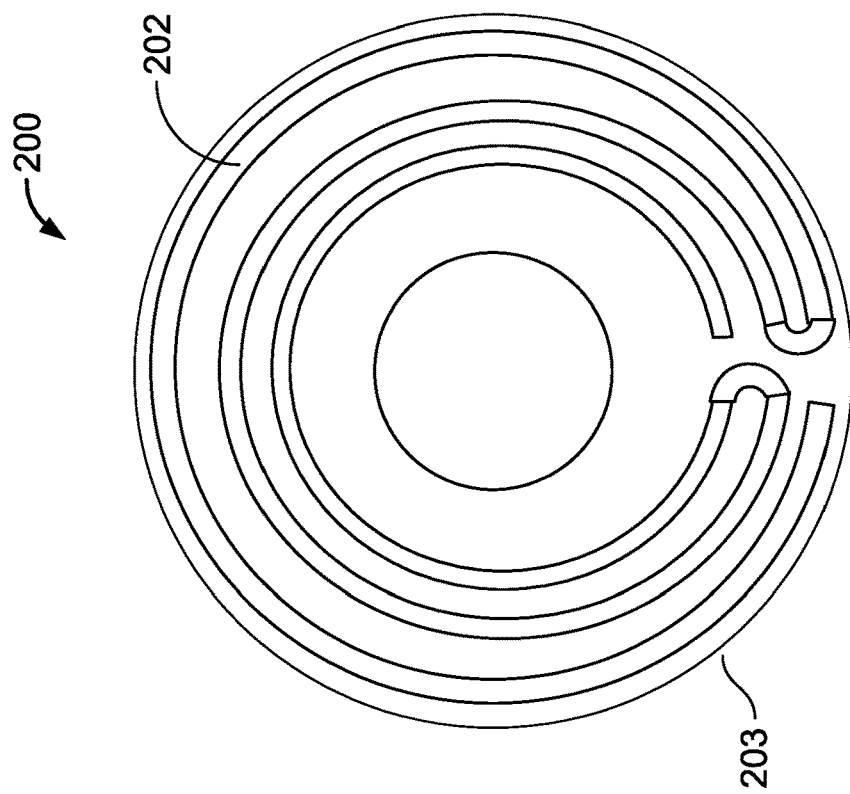
FIG. 10 is a cross-sectional view of a conduit equipped with a circumferential adjustable compactor of a flow management system.

While the flow management system 100 has been described and illustrated with respect to certain dimensions, sizes, shapes, arrangements, materials, and methods, in some embodiments, a flow management system that is otherwise substantially similar in construction and function to the flow management system 100 may include one or more different dimensions, sizes, shapes, arrangements, configurations, and materials or may be utilized according to different methods. For example, while the flow management system 100 has been described and illustrated as including an adjustable compactor 102 that extends around only a fraction of the circumference of the conduit 103, in some embodiments, a flow management system may include an adjustable compactor that has a wavy, sinusoidal, or otherwise spiral configuration that extends around an entire circumference of a conduit. FIG. 10 illustrates a perspective view of such an adjustable compactor 202 (for example, a shape-adjustable compactor) of a flow management system 200 installed within a conduit 203. The flow management system 200 is otherwise substantially similar in construction and function to the flow management system 100 and accordingly includes the electric actuator 104, the actuation line 106, and the control module 124, and may be used in the manner described above with respect to use of the flow management system 100. Extending around the entire circumference of the conduit 203, the adjustable compactor 202 is extendible radially inward to squeeze a blockage to compact and destruct the blockage.

Figure 11:
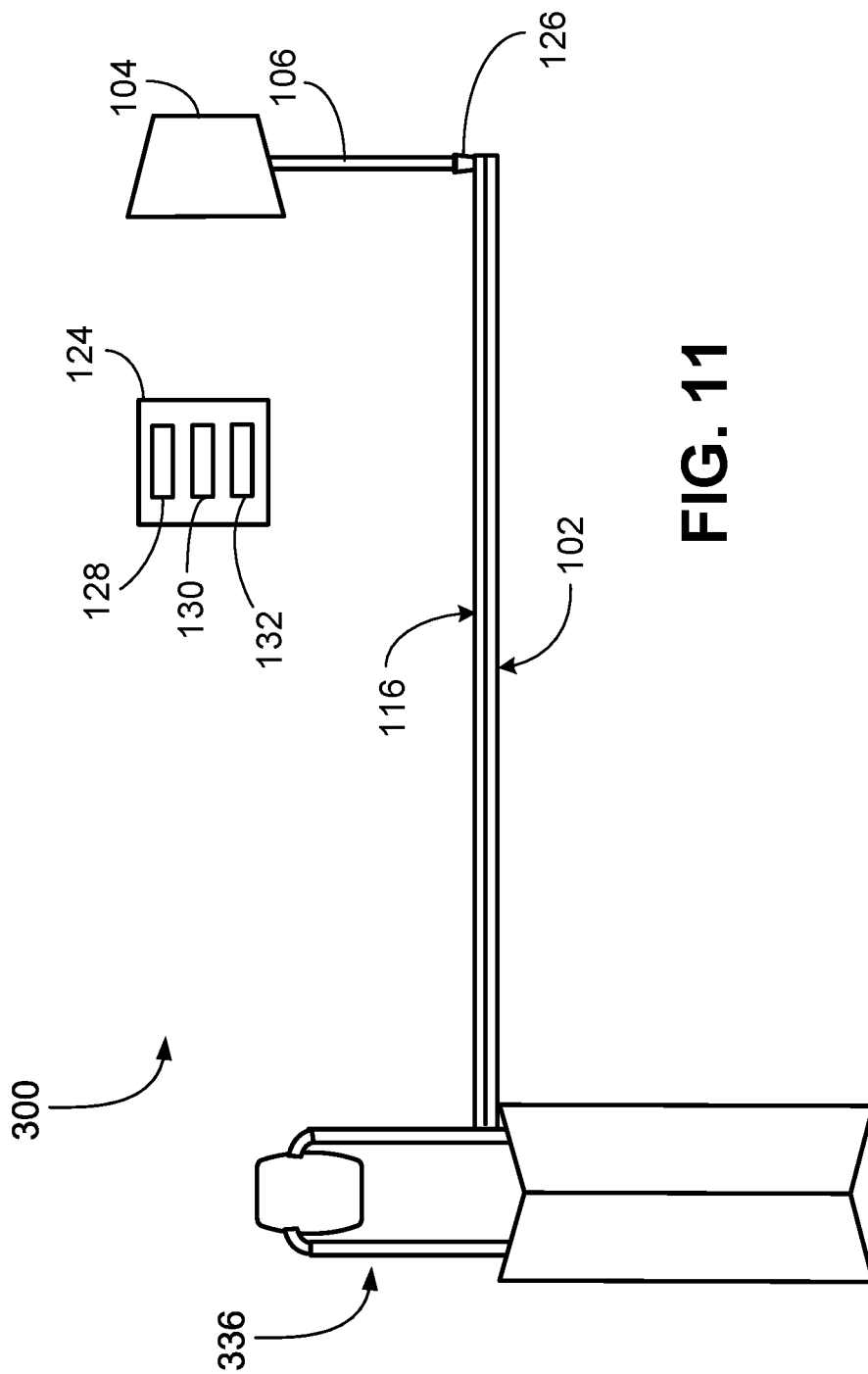
FIG. 11 is a side perspective view of a flow management system that includes a flow rate sensor.

In some embodiments, a flow management system 300 may additionally or alternatively include a flow sensor 336, as shown in FIG. 11. The flow sensor 336 may be located at an outlet end of a conduit such that an upstream blockage would result in a reduced or zero flow rate detected at the flow sensor 336. The flow management system 300 is otherwise substantially similar in construction and function to the flow management system 100 and accordingly includes the adjustable compactor 102, the electric actuator 104, the actuation line 106, and the control module 124. The flow sensor 336 is a differential pressure (for example, diaphragm-type) flow sensor that measures actual flow rates or predicts expected flow rates of a fluid and communicates the flow rates to the control module 124. Such data allows the control module 124 to control actuation of the adjustable compactor 102 automatically without input from an operator concerning a flow behavior of the fluid. For example, if a change in the flow rate of the fluid or a change in a fluid pressure drop across the conduit is detected by the flow sensor 336, then the control module 124 can actuate the adjustable compactor 102 to compact a blockage, as discussed above with respect to the flow management system 100. Accurate determination of the temperature of the fluid may be particularly important when operating the flow management system 300 with the flow sensor 336, as the temperature can change significantly, seasonally.

Figure 12:
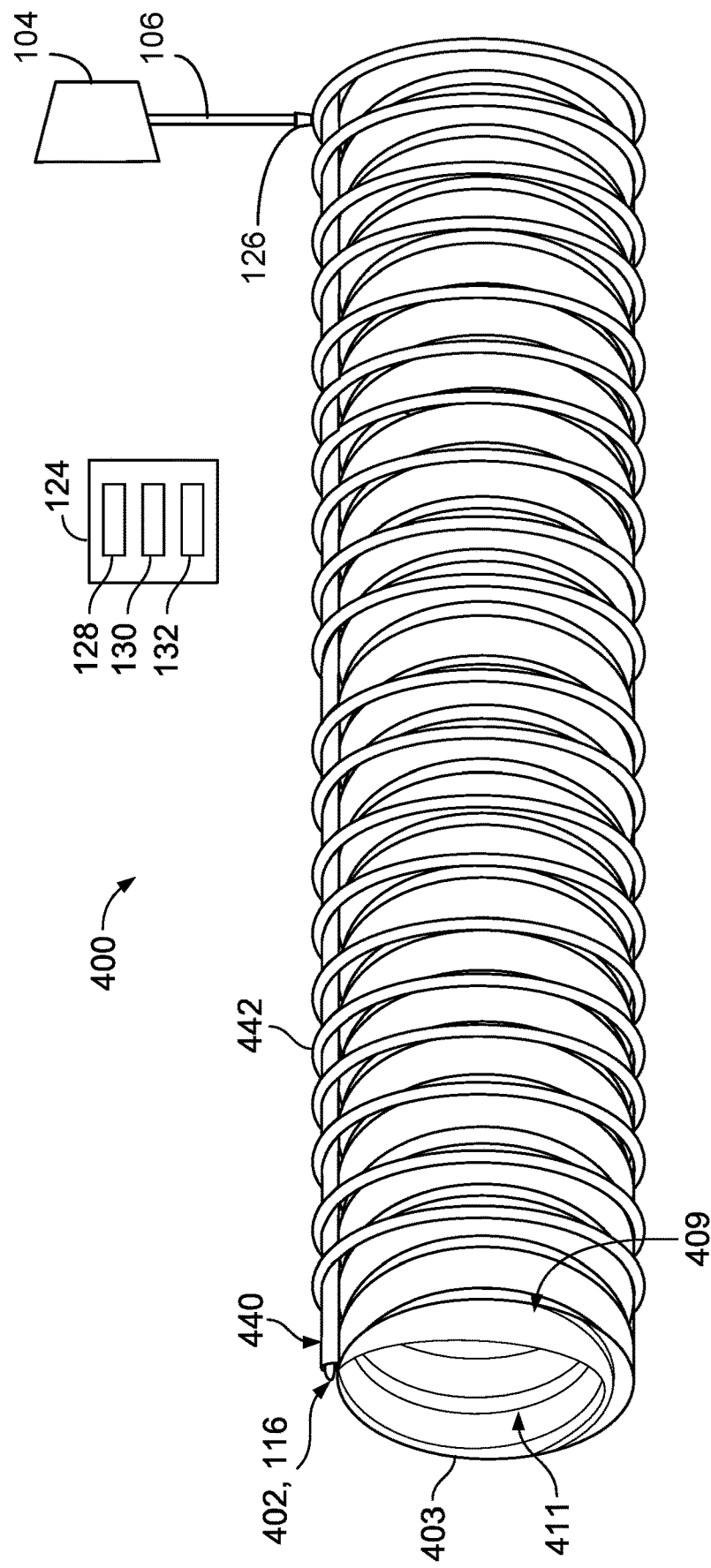
FIG. 12 is a perspective view of a flow management system including an adjustable compactor that is installed to an exterior surface of a conduit.

While the flow management system 100 has been described and illustrated as including an adjustable compactor 102 that is installed along the inner surface 109 of the conduit 103, in some embodiments, a flow management system may include an adjustable compactor that is installed to an exterior surface of a flexible conduit. FIG. 12 illustrates such a flow management system 400, which includes an adjustable compactor 402 (for example, a shape-adjustable compactor) that is installed to an exterior surface 409 of a flexible conduit 403. The conduit 403 is a flexible pipe segment (for example, a flexible transfer hose) formed of a plastic tubular shell that is reinforced with a spiral-shaped metal frame. The conduit 403 may be a segment of an onshore production pipeline or a segment of a subsea production pipeline carrying a flow of fluid 407 that includes one or both of oil and gas.

Figure 13:
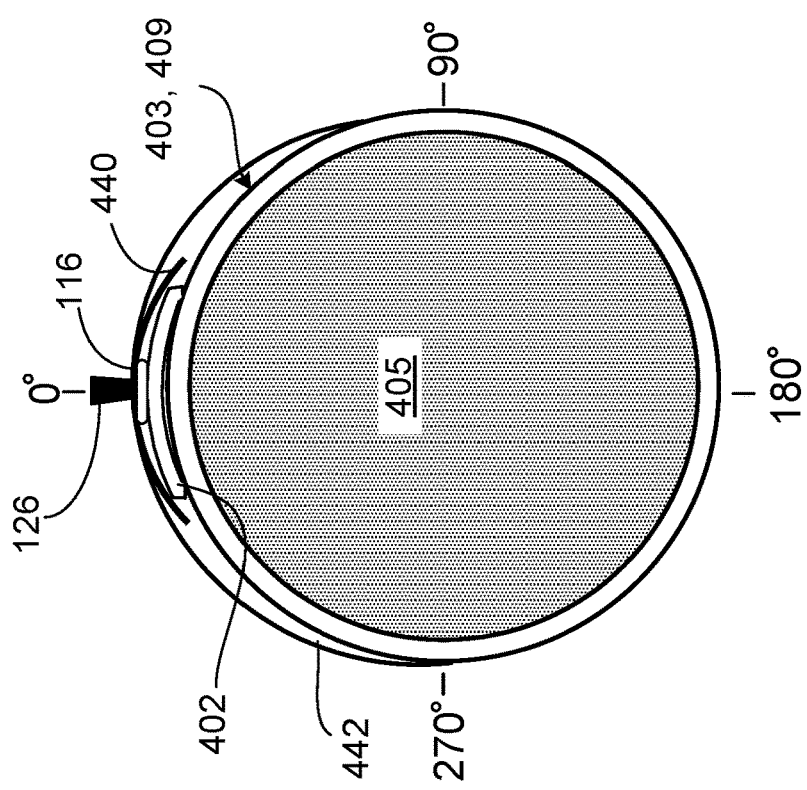
FIG. 13 is a cross-sectional view of the conduit of FIG. 12, obstructed with a flow blockage and equipped with the adjustable compactor of FIG. 12 in a reference configuration.

Referring to FIGS. 12 and 13, the flow management system 400 also includes multiple rigid straps 442 (for example, hoops or braces) that securely hold the adjustable compactor 402 in place against the conduit 403 and an elongate cover 440 that helps to evenly distribute the strain from the adjustable compactor 402 held by the straps 442 to the conduit 403. The flow management system 400 is otherwise substantially similar in construction and function to the flow management system 100 and accordingly includes the electric actuator 104, the actuation line 106, the electrical cable 116, and the control module 124.

In some examples, placement of the adjustable compactor 402 at the exterior surface 409 of the conduit 403 may simplify laying of the electrical cable 116, as compared to an interior installation of the adjustable compactor 102. In some examples, the adjustable compactor 402 may be pre-installed to the conduit 403 at an axial location along the conduit 403 that is predicted to be vulnerable to blockage by multiphase flow assurance hydraulic analyses. In other examples, the adjustable compactor 402 may be retrofitted to the conduit 403 before a blockage 405 has developed in the conduit 403, while the conduit 403 is of a relatively light weight and easy to lift. In yet still other examples, the adjustable compactor 402 may be retrofitted to the conduit 403 after a blockage 405 has developed in the conduit 403 using heavier-duty equipment.

For a retrofit installation of the adjustable compactor 402 to the conduit 403, the conduit 403 is accessed and lifted from the surface (for example, the seabed or the ground) with lifting equipment. The adjustable compactor 402 is positioned against the conduit 403, and the straps 442 are sequentially applied and tightened around the adjustable compactor 402 and the conduit 403 along a length of the adjustable compactor 402. Such installation may be automated by rolling the adjustable compactor 402 and the straps 442 off of a spool and onto the conduit 403. Advantageously, external placement of the adjustable compactor 402 does not interfere with pipeline maintenance when performing scraping or utilizing wellwork wireline tools.

Figure 14:
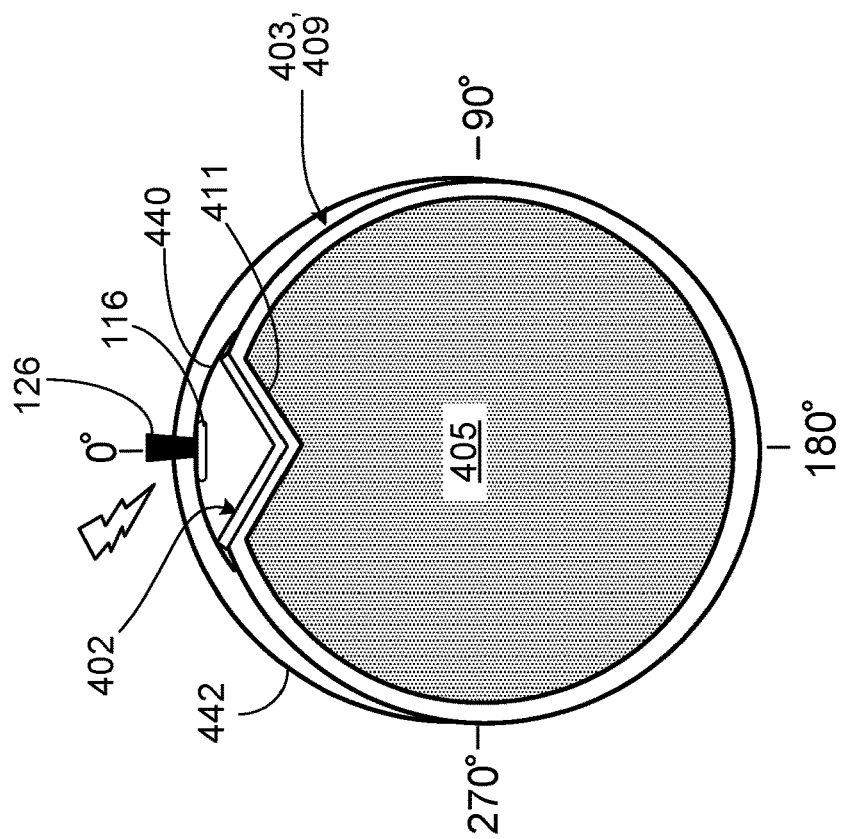
FIG. 14 is a cross-sectional view of the conduit of FIG. 12, obstructed with the flow blockage and equipped with the adjustable compactor of FIG. 12 in an extended configuration.

Since the adjustable compactor 402 is installed to the exterior surface 409 and accordingly not exposed to a corrosive interior environment of the conduit 403, the adjustable compactor 402 may not include a protective, corrosion-resistant outer layer may be made of one or more electropolymer materials that do not necessarily exhibit corrosion resistance, such as polyvinylidene fluoride (PVDF). The adjustable compactor 402 is otherwise substantially similar in construction and function to the adjustable compactor 102. Because the conduit 403 is flexible, radial forces exerted by the adjustable compactor 402 during extension deforms the conduit 403 (for example, pushes the conduit 403 radially inward) to cause the conduit 403 to compact a blockage 405 within the conduit 403 and create a channel 411, as shown in FIG. 14. In this manner, the adjustable compactor 402 does not contact with the blockage 405 directly and thus indirectly compacts the blockage 405.

The straps 442 are distributed along an entire length of the adjustable compactor 402 and the conduit 403 and may be made of one or more materials, such as steel. In the example of FIG. 12, each strap 442 has a width that falls in a range of about 0.5 cm to about 5 cm and a thickness that falls in a range of about 0.025 cm to about 0.25 cm. Installation of several straps 442 ensures that radial pressure applied by the adjustable compactor 402 is completely transferred to the conduit 403 along an entire length of the adjustable compactor 402. Furthermore, using multiple adjustable straps 442 that are distributed along the length of the adjustable compactor 402 allows for installation against a conduit of variable diameter. In contrast, utilizing a single, long strap (for example, a tubular sleeve) may be less effective at ensuring complete transfer of actuation energy in cases where a conduit has a variable diameter.

In some embodiments, the flow management system 400 may alternatively or additionally include rigid elongate straps oriented parallel to a central axis of the conduit 403. Such elongate straps may be disposed between the adjustable compactor 402 and the multiple straps 442 and between the conduit 403 and the multiple straps 442 to further secure the adjustable compactor 402 and ensure complete transfer of the actuation energy to the conduit 403. Such elongate straps may be distributed about a circumference of the conduit 403 in a manner that provides full coverage of the exterior surface 409 of the conduit 403 or in a manner that defines gaps between the elongate straps.

Referring to FIG. 15, the control module 124 can further control the electric actuator 104 to subsequently terminate the current flow to the adjustable compactor 402 to cause the adjustable compactor 402 to the deform to the reference configuration, thereby allowing the conduit 403 to recoil radially outward. Deformation of the conduit 403 to its initial shape exposes the channel 411 to open the conduit 403 to flow of the fluid 407 and accordingly results in depressurization of the fluid 407. With flow of the fluid 407 reestablished in the conduit 403, additional blockage remediation efforts can be carried out at the conduit 403. Referring to FIG. 16, flow of the fluid 107 gradually washes out the blockage 405 and enlarges the channel 411 until the conduit 403 has been substantially cleared of the blockage 405 to permit free, unobstructed flow of the fluid 407.

Figure 17:
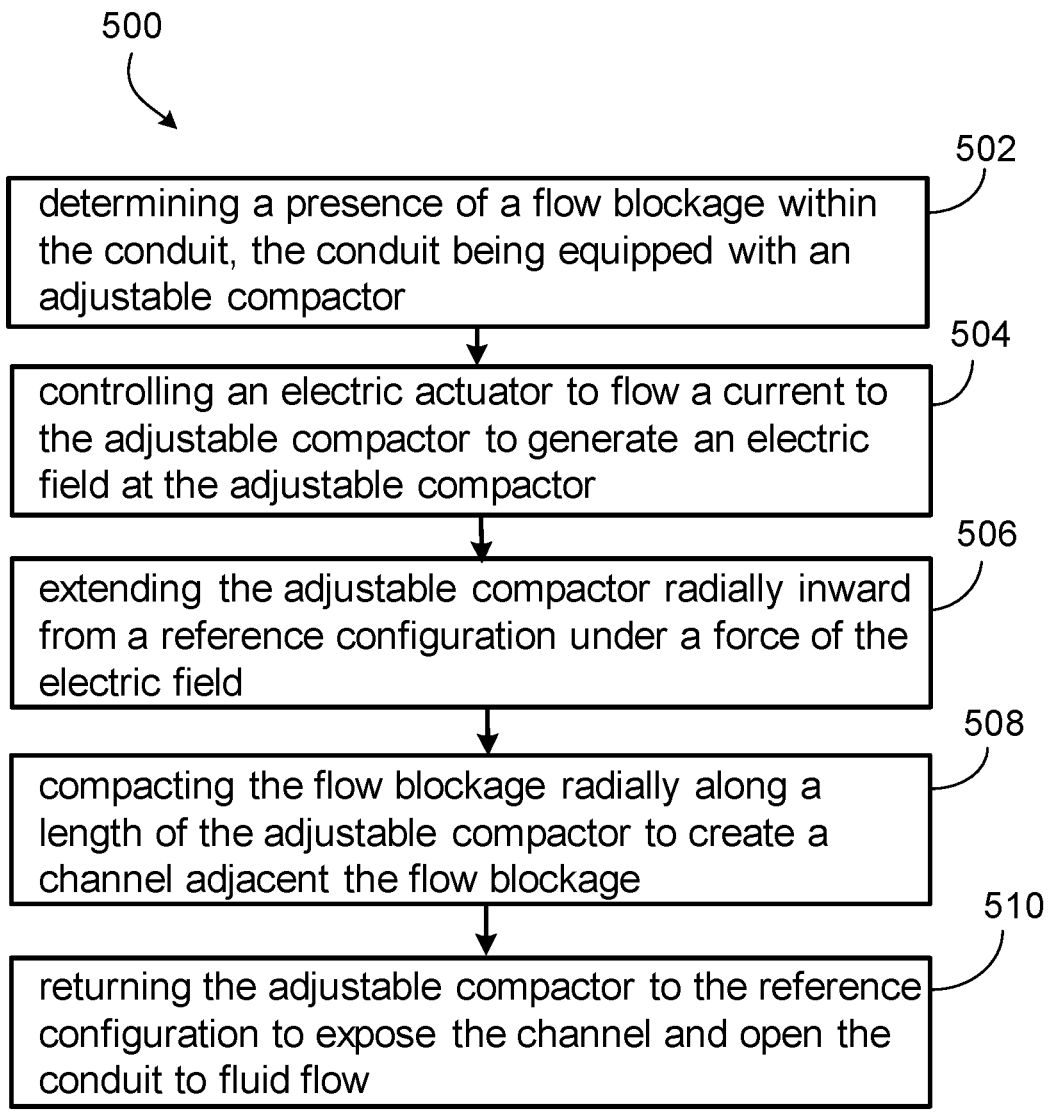
FIG. 17 is a flow chart illustrating an example method of managing a fluid flow within a conduit using any of the flow management systems of FIG. 1, 10, 11, or 12.

FIG. 17 is a flow chart illustrating an example method 500 of managing a fluid flow within a conduit (for example, the conduit 103, 203, 403). In some embodiments, the method 500 includes a step 502 for determining a presence of a flow blockage (for example, the blockage 105, 405) within the conduit, the conduit being equipped with an adjustable compactor (for example, the adjustable compactor 102, 202, 402). In some embodiments, the method 500 further includes a step 504 for controlling an electric actuator (for example, the electric actuator 106) to flow a current to the adjustable compactor to generate an electric field at the adjustable compactor. In some embodiments, the method 500 further includes a step 506 for extending the adjustable compactor radially inward from a reference configuration under a force of the electric field. In some embodiments, the method 500 further includes a step 508 for compacting the flow blockage radially along a length of the adjustable compactor to create a channel (for example, the channel 111, 411) adjacent the flow blockage. In some embodiments, the method 500 further includes a step 510 for returning the adjustable compactor to the reference configuration to expose the channel and open the conduit to fluid flow.

While the flow management system 100 has been described and illustrated as including an electrical cable 116 that extends along the length of the adjustable compactor 102 to carry a current from the actuation line 106, in some embodiments, a flow management system that is otherwise substantially similar in construction and function to the flow management system 100 may not include such the separate electrical cable 116 and instead include an adjustable compactor with an outer protective layer that is conductive and electrically isolated from a pipe wall so as to act as an electrical cable to ensure the flow of electrical current through an entire length of a core layer of the adjustable compactor.

While the example scenarios mentioned above have been described and illustrated with respect to installation of a single adjustable compactor 102, 202, 402 along a conduit, in some implementations, multiple adjustable compactors 102, 202, 402 may be installed to a conduit as necessary to mitigate clogging of the conduit.

While the adjustable compactors 102, 202, 402 have been described and illustrated as part of flow management systems 100, 200, 300, 400, in some embodiments, an adjustable compactor that is generally similar in configuration and function to the any of the adjustable compactors 102, 202, 402 may be deployed in other contexts that are unrelated to petroleum applications, such as biomedical applications (for example, inside of a blood vessel to remove a clog in the vessel).

Other embodiments are also within the scope of the following claims.

What is claimed is:

1. A flow management system, comprising:
   an adjustable compactor configured for attachment to a wall surface of a conduit and being adjustable between an extended configuration and a reference configuration;
   an electric actuator in fluid communication with the adjustable compactor; and
   a control module configured to control the electric actuator to:
      flow a current to the adjustable compactor to generate an electric field that causes extension of the adjustable compactor for compacting a flow blockage within the conduit to create a channel adjacent the flow blockage, and
      terminate a flow of the current to remove the electric field at the adjustable compactor to cause the adjustable compactor to return to the reference configuration for opening the channel to a fluid flow within the conduit.

2. The flow management system of claim 1, wherein the adjustable compactor comprises a shape-adjustable device.

3. The flow management system of claim 1, wherein the adjustable compactor comprises an electrosensitive device configured to deform under a force of the electric field.

4. The flow management system of claim 3, wherein the adjustable compactor comprises a core layer and an outer protective layer that surrounds the core layer.

5. The flow management system of claim 4, wherein the core layer comprises one or more electroactive polymer materials.

6. The flow management system of claim 4, wherein the outer protective layer comprises a corrosion-resistant material.

7. The flow management system of claim 1, wherein the adjustable compactor is an elongate structure.

8. The flow management system of claim 7, wherein the adjustable compactor is configured to deform radially inward with respect to the conduit to compact the flow blockage and to deform radially outward with respect to the conduit to expose the channel.

9. The flow management system of claim 1, wherein the electric actuator is disposed at a surface above a formation in which the conduit is disposed.

10. The flow management system of claim 1, wherein the electric actuator is disposed at a seabed in which the conduit is disposed.

11. The flow management system of claim 1, wherein the electric actuator is disposed in an autonomous vehicle or is fixedly installed to a generator.

12. The flow management system of claim 1, further comprising an actuation line that extends from the electric actuator to an electrical connector at the adjustable compactor.

13. The flow management system of claim 12, further comprising an electrical cable that extends from the electrical connector along a length of the adjustable compactor.

14. The flow management system of claim 12, wherein the actuation line comprises an electrical cable.

15. The flow management system of claim 1, further comprising a flow rate sensor for determining a flow rate of fluid flowing within the conduit.

16. The flow management system of claim 15, wherein the controller is operable to control the electric actuator based on data acquired by the flow rate sensor.

17. The flow management system of claim 1, further comprising a plurality of straps for securing the adjustable compactor to the conduit.

18. The flow management system of claim 17, wherein each strap of the plurality of straps is adjustable in diameter.

19. The flow management system of claim 17, wherein the plurality of straps is distributed along an entire length of the adjustable compactor.

20. The flow management system of claim 17, further comprising a protective cover arranged along an outer side of the adjustable compactor.

* * * * *